United States Patent [19]

Steiner et al.

[11] Patent Number: 5,887,954
[45] Date of Patent: Mar. 30, 1999

[54] VEHICLE BRAKE-PRESSURE CONTROL DEVICE FOR ELECTROHYDRAULIC MULTI-CIRCUIT BRAKE SYSTEM

[75] Inventors: Manfred Steiner, Winnenden; Joachim Nell, Esslingen, both of Germany

[73] Assignee: Mercedes Benz AG, Germany

[21] Appl. No.: 755,470

[22] Filed: Nov. 22, 1996

[30] Foreign Application Priority Data

Nov. 22, 1995 [DE] Germany .................. 195 43 583.4

[51] Int. Cl.[6] ........................................... B60T 8/26
[52] U.S. Cl. ................................. 303/113.4; 303/114.1; 303/115.2
[58] Field of Search ..................... 303/113.1, 113.4, 303/113.5, 114.1, 115.2, 115.4, 116.2, 116.1, 186

[56] References Cited

U.S. PATENT DOCUMENTS

| | | | |
|---|---|---|---|
| 5,150,951 | 9/1992 | Leiber et al. | 303/113.4 |
| 5,152,585 | 10/1992 | Patient et al. | 303/113.4 |
| 5,167,441 | 12/1992 | Schonlau et al. | 303/113.4 |
| 5,246,283 | 9/1993 | Shaw et al. | |
| 5,302,008 | 4/1994 | Miyake et al. | |
| 5,312,172 | 5/1994 | Takeuchi . | |

FOREIGN PATENT DOCUMENTS

| | | |
|---|---|---|
| 34 10 006 | 9/1985 | Germany . |
| 43 35 769 | 12/1994 | Germany . |
| 2156021 | of 0000 | United Kingdom . |
| 2283067 | of 0000 | United Kingdom . |

*Primary Examiner*—Matthew C. Graham
*Attorney, Agent, or Firm*—Evenson, McKeown, Edwards & Lenahan, P.L.L.C.

[57] ABSTRACT

A brake-pressure control device is provided for a road vehicle with electrohydraulic multi-circuit brake system. For each wheel brake, a hydraulic servo-cylinder is driven by an electric motor. The servo-cylinders enables certain functions to be implemented, namely spot braking mode, including electronic control of the VA/HA braking force distribution (EBKV); anti-lock braking control (ABS function); traction control (TCS function); and vehicle movement control as a result of automatically controlled increase in brake slip at one or more of the wheels of the vehicle. A desired-value setting unit with a single-circuit master cylinder is provided which, in normal electronically controlled braking mode, serves as a desired-value transmitter and, in the event of failure of the vehicle's electronic system, can be activated as an emergency braking unit for building up brake pressure in the front-wheel brakes.

16 Claims, 4 Drawing Sheets

VEHICLE BRAKE-PRESSURE CONTROL DEVICE FOR ELECTROHYDRAULIC MULTI-CIRCUIT BRAKE SYSTEM

BACKGROUND AND SUMMARY OF THE INVENTION

The present invention relates to a brake-pressure control device for a road vehicle with electrohydraulic multi-circuit brake system.

A conventional brake-pressure control device is described in DE 43 35 769 C1. This known brake-pressure control device comprises hydraulic servo-cylinders which are individually assigned to the wheel brakes, can be driven by electric motor and permit, in a single stroke of their piston, the maximum brake pressure in the connected wheel brake for which the brake is designed to be increased and decreased. Under the control of the electronic output signals of an electronic control unit, the device enables at least the following functions to be implemented:

(a) Control of the spot braking mode in accordance with desired-value signals which can be generated by the driver by a desired-value setting unit which can be activated by the driver and are characteristic of the anticipated value of the deceleration of the vehicle, including control of the front-axle/rear-axle braking force distribution;

(b) If appropriate, automatic triggering of full braking if the activation behavior of the driver, which can be detected from a chronological processing of sensor output signals of the desired-value setting unit, signals the driver's desire for high deceleration of the vehicle;

(c) Anti-lock braking control by automatically controlled brake-pressure modulation;

(d) Traction control by automatic activation of the wheel brake for each vehicle wheel which tends to spin;

(e) Vehicle movement control by automatically controlled increase in brake slip at one or more of the wheels of the vehicle; and (f) If appropriate, a vehicle spacing control for backed-up traffic by automatic activation of the brake system as a function of output signals of a sensor system which detects the distance from a vehicle which is travelling in front.

The desired-value setting unit comprises a static single-circuit master cylinder which can be activated directly by a customary brake pedal, i.e. without intermediate connection of a brake booster, and to whose output pressure space the front-wheel brakes are connected via, in each case, one change-over valve which is constructed as a 2/2-way solenoid valve. The switched position of the valves which is assumed when their switching magnets are excited is a blocking position in which the front-wheel brakes are blocked off from the output pressure space of the single-circuit master cylinder and in the flow position, which is assumed as the normal position, brake fluid can be displaced directly into the front-wheel brakes by activating the master cylinder. Thereby, in the event of a failure of the vehicle electrical system, emergency braking is possible by activating the front-wheel brakes, to achieve a relatively high deceleration of the vehicle of up to 0.4 g (g=9.81 ms$^{-2}$) which is higher than the legally required minimum deceleration.

So that, with the known brake-pressure control device, a pedal travel/braking force characteristic of the brake-pressure control device which is favorable, in terms of ergonomic criteria, for a good metering of the brake pressure generating procedure which is to be initiated by the driver in the case of spot braking can be achieved, the feeding of brake fluid into the wheel brake cylinders takes place during spot braking as a result of the combined effect of the master cylinder and of the brake-pressure servo-cylinders. For example, the feeding takes place by virtue of the actuation travel of the pistons of these servo-cylinders for whose monitoring position transmitters which are individually assigned to the servo-cylinders are provided is adjusted in accordance with the actuation travel of the piston of the master cylinder which can also be detected by a pedal-position sensor. A defined ratio of the quantity of brake fluid which is fed into the front-wheel brakes by the master cylinder to the quantity of brake fluid which can be fed into the front-wheel brakes by the servo-cylinders is thereby obtained. In the possible situations of automatic activation of the front-wheel brakes which takes place for the methods of adjustment and control mentioned above, the brakes are blocked off from the master brake cylinder by actuation of the change-over valves. Thereafter, the brake-pressure control takes place solely by actuation, which is appropriate for control, of the brake-pressure servo-cylinders both of the front-wheel brakes and of the rear-wheel brakes of the vehicle, at the rear-wheel brakes also in the case of spot braking.

This function of the known brake-pressure control device has the effect that, when the anti-lock braking control responds, the pedal reaction which is intended, as it were, to provide the driver with the acknowledgement of the functional state of the brake system, changes drastically, because the brake pedal becomes, so to speak, "hard" in that it can no longer be moved on, and the further metering of the brake pressure which is used for building up the brake pressure again is made difficult. This is disadvantageous in particular if the braking takes place on a section of roadway with a very low coefficient of adhesion between the roadway and the wheels of the vehicle. Under this condition, a particularly short pedal travel results, i.e. a sudden change in the pedal reaction which suggests to the driver, in none too seldom cases, the impression of a defect in the brake system. That is, a distraction arises from which incorrect driving behavior, and thus a potentially hazardous situation, can well result. Brake activation situations which are similarly capable of misinterpretation and, moreover, also adversely affect comfortable operation of the brake system can arise if the driver wishes to brake manually during a vehicle-movement or vehicle-spacing control phase and, when doing so, is initially confronted with a "hard" brake pedal because the change-over valves are still closed. The same applies correspondingly to the case in which the vehicle is equipped with a front-axle drive and the driver wishes to initiate braking in the course of a traction control phase during which the change-over valves of the front-wheel brakes are likewise closed.

In addition, the maximum capacity of the output pressure spaces of the servo-cylinders of the front-wheel brakes must be greater than the maximum capacity of the connected wheel brakes. In other words, starting from a normal position of the servo-cylinder pistons in which the volume of the servo-cylinder output pressure spaces corresponds to the maximum absorption volume of the connected wheel brakes, in the event of anti-lock braking control only starting at a very high brake pressure, complete elimination of the brake pressure is nonetheless possible which, in this respect, requires an increased overall length of the servo-cylinders of the front-wheel brakes.

A brake system with electric braking-force actuators is also described in DE 34 10 006 A1. Furthermore, this brake system also has a master brake cylinder which applies brake pressure to hydraulic wheel brake cylinders of the front axle. The hydraulic generation of brake pressure is configured as a fallback level. The electric braking-force actuators are regulated by a control device which, for this purpose, is fed a signal relating to the activation of the brake pedal and signals relating to the wheel speeds of the individual wheels. The function of an ABS system or of a traction control system can also be integrated into the control unit.

An object of the present invention is, therefore, to provide an improved brake-pressure control device such that, in an overwhelming number of braking situations which are controlled by the driver by activating the single-circuit master cylinder, the reaction force which can be felt at the brake pedal as a function of the pedal travel is a reliable measure of the anticipated value of the deceleration of the vehicle and a pedal travel/brake pressure characteristic is achieved which also helps to avoid distractions relating to the operational capability of the brake system.

This object has been achieved according to the present invention by providing a single-circuit master cylinder which is configured such that the volume of brake fluid displaceable from an output pressure space thereof as a result of displacement of a piston thereof by a maximum stroke $s_{max}$ is substantially greater than a capacity of the wheel brakes of the front-axle brake circuit which has to be displaced into the brakes to achieve a defined pressure necessary for minimum deceleration. The front-wheel brakes are configured to be also blocked off from the single-circuit master cylinder in the event of electrically controlled spot braking, and a maximum capacity of a output pressure spaces of the brake-pressure servo-cylinders of the front-wheel brakes is limited to a volume capable of being displaced into the respectively connected front-wheel brake to achieve a maximum brake pressure. A storage element into which brake fluid can be displaced from the single-circuit master cylinder counter to an increasing reaction force is connected to a pressure outlet of the single-circuit master cylinder of the desired-value setting unit, the maximum capacity of the storage element corresponding at maximum to an additional amount by which the volume of brake fluid which is displaceable from the master cylinder is greater than the volume of brake fluid which is displaceable into the front-wheel brakes in emergency operating mode to achieve the defined minimum deceleration.

Accordingly, the single-circuit master cylinder is dimensioned such that the total volume of brake fluid which can be displaced from the output pressure space of the master cylinder by displacing the piston of the master cylinder by the maximum stroke $s_{max}$ which can be prescribed by physical means is significantly, preferably by a defined fraction, greater than the volume of that quantity of brake fluid which has to be displaced into the front-wheel brakes in order to achieve in the brakes a defined brake pressure which is provided for emergency braking situations according to the configuration of the brakes. In combination therewith, also in the event of electrically controlled spot braking, the front-wheel brakes are blocked off from the single-circuit master cylinder by actuation of the change-over valves. That is, the brake pressure build-up takes place solely by activation of the brake-pressure servo-cylinders. It is thus possible, as further provided, for the maximum capacity of the output pressure spaces of the brake-pressure servo-cylinders to be limited to that volume which has to be capable of being displaced into the respectively connected wheel brake in order to achieve a maximum brake pressure in the wheel brake, and this corresponds to the lowest possible spatial requirement of the brake-pressure servo-cylinders.

Furthermore, a storage element is connected to the pressure outlet of the single-circuit master cylinder of the desired-value setting unit, into which storage element brake fluid can be displaced counter to an increasing reaction force by activating the single-circuit master cylinder. Thereby, a displacement of the master cylinder piston, and thus an ergonomically favorable travel/force characteristic curve of the brake-pressure control device can be attained even if the front-wheel brakes are blocked off from the single-circuit master cylinder.

Finally, in combination with the foregoing aspect of the present invention, the maximum capacity of the storage element can correspond to, at maximum, the additional amount by which the volume of brake fluid which can be displaced from the master cylinder is greater than the capacity of the front-wheel brakes which is necessary in emergency braking situations to achieve a defined minimum deceleration. As a result, it is ensured that a build-up in brake pressure which is necessary for a sufficient deceleration of the vehicle of, for example, 0.4 g remains possible solely by activating the single-circuit master cylinder, in an emergency braking mode of the brake-pressure control device which has to be possible even in the event of a failure of the vehicle's electrical system.

A favorable relation between pedal travel in the emergency braking mode and the capability of metering in the spot braking mode is obtained if the maximum capacity of the storage element is between 30 and 60%, preferably about 50%, of the total volume of brake fluid which can be displaced in total into the front-wheel brakes.

A storage element which is suitable for these relations can be easily realized as a piston-spring storage device. In particular, for the emergency braking mode of the brake-pressure control device, the storage element can advantageously be blocked off from the single-circuit master cylinder. Thereby, the entire volume of brake fluid displaceable therefrom is available for building up the brake pressure in the front-wheel brakes.

It is easily possible to block off the storage element from the master cylinder automatically, with any desired appropriate configuration of the storage element, in the event of a failure of the vehicle's electrical system. This can be effected by connecting a solenoid valve between the storage element and the master cylinder. The excited position of the solenoid valve is its flow position, and its normal position, which is spring-centered, is its blocking position.

Provided that the storage element is constructed as a piston-spring storage device in which the storage spring is arranged in a spring chamber which is filled with brake fluid and can be communicatingly connected to the brake-fluid reservoir vessel, a functionally corresponding solenoid valve can be connected between the reservoir vessel and the spring chamber.

As an alternative to a "passive" piston-spring storage device, a hydraulic cylinder which can be driven by an electric motor and has a piston whose position is monitored can constitute the storage element. The drive of the cylinder preferably is not self-locking but instead provided with a mechanical arresting brake which is automatically active in the de-energized case. With such a storage element, in principle any desired pedal travel/reaction force characteristic curves can be obtained by appropriate electrical actuation of the drive. It is also possible, in the event of anti-lock braking control, to initiate a reaction behavior of the master cylinder which intelligibly signals the activation of anti-lock braking control to the driver.

So that excessively large pedal activation travels do not have to be tolerated in emergency braking mode, it is particularly advantageous if, for emergency braking, the single-circuit master cylinder can be adjusted to a ratio of its displacement volume related to the piston stroke which is increased in comparison with the spot braking mode. It is particularly advantageous for safety reasons to adjust the master cylinder automatically, for example with path control, to the displacement volume/stroke ratio which is increased for the emergency braking mode.

Alternative configurations of the single-circuit master cylinder which are suitable for the foregoing purposes are disclosed below and enable activation, in each case after a minimum stroke of the master cylinder piston which can be activated by the brake pedal, of an additional piston face and as a result increasing the volume of brake fluid which can be displaced from the master cylinder per unit of the stroke.

Configuring the master cylinder such that a prestressed compression spring, whose prestress is smaller than that of the restoring spring of the single-circuit master cylinder, is arranged in the radially inner annular space of the piston arrangement is particularly advantageous in this context, in which configuration a steady transition of the force/travel relation, which is decisive for the spot braking mode, to the force/travel relation which is valid in the emergency braking mode can be achieved by appropriate matching of a spring, which acts between two piston elements, to the reaction force which is conditioned by the brake pressure.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
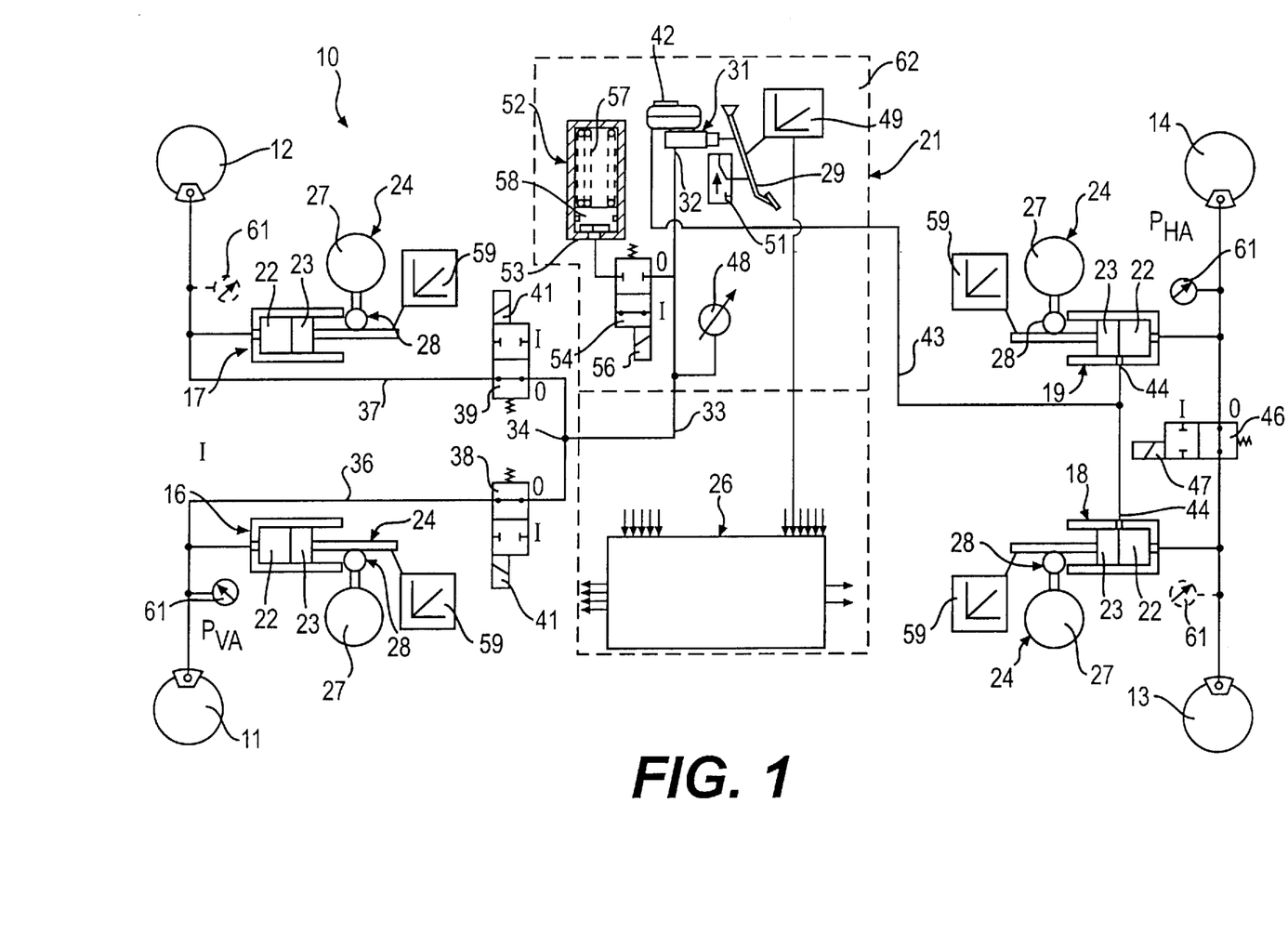
FIG. 1 is a schematic block diagram of an electrohydraulic brake system having a brake-pressure control device, according to the present invention, in which a piston-spring storage element is provided for pedal-travel simulation.

The brake system which is designated generally by numeral 10 in FIG. 1, for a road vehicle which is represented thereby and for which it may be assumed, solely for the purpose of explanation, a rear-axle drive is provided. The brake system 10 comprises four brake-pressure actuators 16, 17 and 18, 19 which are each individually assigned to the front-wheel brakes 11, 12 and the rear-wheel brakes 13, 14, respectively, and can be actuated by a driver-actuatable brake-pressure control device designated generally by numeral 21 in order to generate brake pressures which can be applied to the wheel brakes 11 to 14.

The brake-pressure actuators 16 to 19 are, in terms of their basic configuration, constructed as hydraulic linear cylinders which each have an output pressure space 22 connected to one of the front-wheel brakes 11, 12 or the rear-wheel brakes 13, 14 and is movably delimited on one side by a piston 23 which is displaceably guided in the cylinder casing in a pressure-tight manner. By displacement of the piston 23, in the sense of reducing the volume of the output pressure space 22, brake fluid can be forced into the respectively connected wheel brake. As a result, brake pressure can be built up, and with displacement of the piston 23, to increase the volume of the respective output pressure space 22, brake pressure can be reduced in the respectively connected wheel brake.

For driving the pistons 23 of the brake-pressure actuators 16 to 19, the actuators 16 to 19 are provided with electromotive linear drives 24 which can be actuated by output signals of an electronic control unit 26 of the brake-pressure control device 21 in order to drive the pistons 23 in alternative directions of movement. Such linear drives, which have an electric motor 27 with reversible rotational direction and a schematically indicated gear mechanism 28, which ensures correlated translation of the rotational movements of the armature of the electric motor 27 into the reciprocating movements of the piston 22 by positive engagement of driving and driven elements, are expediently constructed as spindle drives. The drive spindles of the spindle drives or spindle nuts which engage with the piston 23 are driven by spur gearing which, being switchable to alternative rotational directions, can provide different transmission ratios. In particular, a greater transmission ratio can be effective in the case of the pressure-reducing stroke of the piston 23 than in the displacement stroke which leads to the building up of brake pressure in the connected wheel brake.

As a control unit, the brake-pressure control device 21 comprises, by whose activation the driver can determine the magnitude of a desired vehicle deceleration, a "rudimentary" single-circuit master cylinder 31 which can be activated by a brake pedal 29, has only one pressure outlet 32 and can be activated "directly", without the customary intermediate connection of a brake booster, but otherwise corresponds structurally to a customary static master cylinder.

Connected to this single-pressure outlet 32 of the master cylinder 31 is a master brake line 33 which branches at a branch point 34 into two brake line branches 36, 37 which each lead to one of the two front-wheel brakes 11, 12 and are each connected directly thereto. As a result, the two front-wheel brakes 11, 12 of the vehicle are combined to form a front-axle brake circuit I. The two brake line branches 36, 37 can be blocked off, individually or together, from the master brake line 33 by one of two change-over valves 38, 39.

The change-over valves 38, 39 are constructed as 2/2-way solenoid valves which can in turn be actuated by output signals of the electronic control unit 26 of the brake-pressure control device 21 and whose normal position 0, assumed in the non-excited state of their control magnets 41, is a flow position which connects the respective front-wheel brake 11 or 12 to the master brake line 33, and whose switched position I, assumed in the excited state of the control magnet 41, is a blocking position in which the front-wheel brake or brakes 11 and/or 12 is/are blocked off from the master brake line 33 and the pressure outlet 32 of the master cylinder 31.

Assuming a fault-free state of the brake system 10, the change-over valves 38, 39 are switched over into the blocking position I whenever the respectively connected wheel brake or brakes 11 and/or 12 is/are activated, irrespective of whether activation is controlled by the driver or is triggered automatically, for example for the purpose of vehicle movement control.

In contrast with the brake-pressure actuators 16, 17 which are provided for the respective front-wheel brakes 11, 12 and whose output pressure spaces 22 are communicatingly connected to the pressure outlet 32 of the single-circuit master cylinder 31 of the brake-pressure control device 21 in the normal positions 0 of the change-over valves 38 and 39 and, in the non-activated state of the single-circuit master cylinder 31, are communicatingly connected to the brake-fluid reservoir vessel 42 of the master cylinder 31. As a result, the required volume-equalizing flows are achieved.

The brake-pressure actuators 18, 19 of the respective rear wheel brakes 13, 14 are constructed in the manner of single-circuit master cylinders whose pressure output spaces which are permanently connected to the rear-wheel brakes 13, 14 can be connected "directly" to the brake-fluid reservoir vessel 42 of the single-circuit master cylinder 31 by a common equalizing line 43. This communicating connection of the brake-fluid reservoir vessel 42 of the brake-pressure control device 21 to the output pressure spaces 22 of the brake-pressure actuators 18, 19 of the respective rear-wheel brakes 13, 14 of the vehicle only exists if the pistons 23 thereof are in their illustrated normal position which corresponds to the non-activated state of the brake system 10 and in which equalizing flow paths which are illustrated in schematically simplified form by blow holes 44 are released. The equalizing flow paths are blocked after a short initial section of a pressure-increasing stroke of the piston 23 of the brake-pressure actuators 18 and/or 19 of the respective rear-wheel brakes 13 and/or 14.

Connected between the rear-wheel brakes 13, 14 is a 2/2-way solenoid pressure-equalizing valve 46. The valve 46 can be actuated by output signals of the electronic control unit and, in its flow position, assumed in the non-excited state of its control magnet 47 as normal position 0, connects the two rear-wheel brakes 13, 14 to one another. In its switched position I, assumed when its control magnet 47 is excited with an output signal of the electronic control unit 26, the valve 46 blocks off the rear-wheel brakes 13, 14 from one another, with the flow position 0 of this equalizing valve 46 being assigned to a spot braking mode, controlled by the driver, of the brake system 10. The blocking position I is assigned, for example, to a traction control mode of the brake system 10. This latter mode requires individual activation of a rear-wheel brake 13 or 14 without the driver activating the brake-pressure control device 21.

The linear drives 24 of the brake-pressure actuators 16 to 19 are advantageously constructed as non-self-locking drives so that a pressure-reduction movement of the pistons 23 of these brake-pressure actuators 18 and 19 is supported by the pressure prevailing in the respectively connected wheel brake 13 and/or 14. The normal position of the respective piston 23 is marked for example by a stop effect of the same with a stop element (not illustrated) which is non-displaceable with respect to the cylinder casing.

The initial position from which a brake-pressure-increasing stroke of the respective piston 23 of the brake-pressure actuators 16, 17 of the respective front-wheel brakes 11, 12 occur, corresponds to the maximum volume of the output pressure space 22 of the brake-pressure actuators 16, 17. The brake-pressure-increasing stroke permits a maximum brake pressure to be developed in the respectively connected wheel brake 11 or 12, and the maximum brake pressure permits, even in the case of a dry road with good grip, the locking limit of the respective wheel brake 11 or 12 to be reached.

The foregoing applies correspondingly to the normal position of the pistons 23 and of the brake-pressure actuators 18, 19 of the respective rear-wheel brakes 13, 14.

The brake-pressure control device 21 comprises an electronic or electromechanical pressure sensor 48 which is connected to the master brake line 33 or the pressure outlet 32 of the single-circuit master cylinder 31 and generates an electrical output signal which is fed to the electronic control unit 26 as information input and which is a measure of the output pressure of the single-circuit master cylinder 31 which is generated by activation of the master cylinder 31. This output signal of the pressure sensor 48 can be used in the spot braking mode of the brake system 10 as a desired-value setting signal for the brake pressure which is to be applied to the front-axle brake circuit I, and the output signal is fed to the electronic control unit 26.

The brake-pressure control device 21 further comprises an electronic or electromechanical pedal-position transmitter 49 which generates electrical output signals which contain the information on how far the brake pedal 29 is deflected from its position of rest assigned to the non-activated state of the brake system 10. The output signals of this pedal-position transmitter 49 also make detection of those positions of the brake pedal 29 which the brake pedal 29 assumes between its normal position and that position in which the customarily provided brake light switch 51 of the brake system 10 responds.

The single-circuit master cylinder 31 of the brake-pressure control device 21 is configured so that the volume of brake fluid which can be displaced into the front-axle brake circuit I solely as a result of the activation of the master cylinder 31 by the brake pedal 29 is sufficient to attain a defined minimum brake pressure in the wheel brakes 11, 12 of the front-axle brake circuit I. This minimum brake pressure is sufficient to achieve a defined minimum deceleration of the vehicle.

Furthermore, the brake-pressure control device 21 includes a pressure accumulator 52 which is illustrated as a piston-spring storage device whose storage chamber 53 can be connected via a function control valve 54 to the pressure outlet 32 of the single-circuit master cylinder 31 of the brake-pressure control device 21.

The function control valve 54 is a 2/2-way solenoid valve which, in the de-energized state of its control magnet, assumes its blocking normal position 0 in which the storage chamber 53 of the pressure accumulator 52 is blocked off from the pressure outlet 32 of the single-circuit master cylinder 31 of the brake-pressure control device 21. When its control magnet 56 is excited with an output signal of the electronic control unit 26, the valve 54 goes into a flow position I as a switched position in which the pressure outlet 32 of the single-circuit master cylinder 31 is communicatingly connected to the storage chamber 53 of the pressure accumulator 52.

The pressure accumulator 52 is configured so that the maximum capacity of its storage chamber 53 corresponds approximately to half the value of the volume of brake fluid which can be displaced from the output pressure space (not illustrated) of the single-circuit master cylinder 31 as a result of an activation of the master cylinder 31 corresponding to the maximum pedal travel. To this end, for example, the storage spring 57, against whose increasing restoring force the piston 58 can be displaced in the sense of increasing the volume of the storage chamber 53, is constructed such that its turns, assuming that the restoring spring 57 is constructed as a helical spring, lie on a block, limiting the stroke of the piston. In this limit position of the piston 58 and of its storage spring 57, the prestressing of the spring 57 corresponds to the force which results from applying to the storage piston 58 that pressure which has to be capable of being built up in the front-wheel brakes 11, 12 solely by activating the master cylinder 31.

The brake-pressure actuators 16 to 19 which are individually assigned to the respective wheel brakes 11 to 14 are each provided with one electronic or electromechanical position transmitter 59 which generates an electrical output signal which, in terms of level and/or frequency, is a measure of the position of the piston 23 within the respective actuator casing and is thus also an accurate measure of the volume of the output pressure space 22 of the respective brake-pressure actuator 16 to 19.

Furthermore, connected to at least one of the front-wheel brakes 11 and/or 12 and also to at least one of the rear-wheel brakes 13 and/or 14 is an electronic or electromechanical pressure sensor 61 which generates an electrical output signal which is fed to the electronic control unit 26. In terms of level and/or frequency, the sensor 61 is a measure of the brake pressure $p_{VA}$ and $p_{HA}$ which is applied to the respectively connected wheel brake 11 and/or 12 or 14 and/or 13.

With the brake system 10 explained thus far, the following functions can be implemented in the brake system 10. The intention is that the following explanation will also provide an adequate description of the electronic circuitry design of the electronic control unit 26 which controls these functions. The control unit 26 can be implemented, given knowledge of its purpose, by a person skilled in the art of electronic circuitry, using contemporary technical means:

a) Spot braking, if appropriate, including electronically controlled front-axle/rear-axle braking force distribution (EDKV)

In the case of spot braking, in which the development of brake pressure is controlled by the driver by activating the single-circuit master cylinder 31, the change-over valves 38, 39 of the front-axle brake circuit I are switched over into their blocking position I. The function control valve 54 is switched over into its flow position I. Thereby, brake fluid can be displaced from the master cylinder 31 only into the storage chamber 53 of the pressure accumulator 52. The build-up of brake pressure in the wheel brakes 11, 12 takes place exclusively by way of the brake-pressure actuators 16, 17.

Starting from the response of the brake light switch 51, the brake-pressure actuators 18, 19 which are assigned to the respective rear-wheel brakes 13, 14 are also actuated in the sense of building up the brake pressure. The output pressure $p_{HA}$ of the rear-wheel brakes 13, 14, which is monitored by the pressure sensor 61 assigned to the right-hand rear-wheel brake 14, when the equalizing valve 46 is open, is adjusted in accordance with the output pressure, which can be detected by the pressure sensor 48, of the single-circuit master cylinder 31 and/or the brake pressure $p_{VA}$ which is detected by the pressure sensor 61 of the front-axle brake circuit I. Thus, a desired, for example the ideal, distribution of braking force which corresponds to identical utilization of adhesion at the front wheels and at the rear wheels is obtained.

b) Anti-lock braking control (ABS function)

If a tendency to lock occurs at one of the front wheels of the vehicle, the associated brake-pressure actuator 16 or 17 is actuated in the sense of reducing brake pressure in the wheel brake. The brake-pressure holding function is achieved by deactivating the respective actuator drive 24.

For anti-lock braking control at the rear-wheel brakes 13, 14, the brake-pressure actuators 18, 19 of the wheel brakes 13, 14 are preferably actuated together in the sense of increasing the volume of their output pressure spaces 22. Moreover, the control of phases for holding the brake pressure and phases for building the brake pressure up again at the rear-wheel brakes 13, 14 takes place in a manner analogous to that at the front-wheel brakes 11 and 12 according to known criteria of brake slip control.

c) Traction control (TCS function)

The activation of one or both wheel brakes 13, 14 of the driven vehicle wheels which is necessary for this without the intervention of the driver is possible as a result of the respective brake-pressure actuator 18 and/or 19 being actuated in a brake pressure-increasing fashion. The same applies to reducing the brake pressure again, in which case, in TCS mode, the equalizing valve 46 is moved into its blocking position I.

d) Automatic activation of the wheel brake of a non-driven vehicle wheel for vehicle movement control (VMC)

For individual or common activation of the front-wheel brakes 11, 12, one or both of the latter is/are blocked off from the single-circuit master cylinder 31 by driving the respective change-over valve 38, 39 into its or their blocking position I. One or both of the brake-pressure actuators 16, 17 is/are adjusted to brake-pressure control mode which is, in turn, accomplished according to known criteria of vehicle movement control.

Owing to the possibility of automatic activation of all the wheel brakes 11 to 14, the brake system 10 also fulfills the conditions for vehicle spacing control in the case of backed-up traffic, a vehicle spacing sensor system (not illustrated) on the vehicle having to be additionally provided for this.

e) Automatic full braking (brake boosting function)

Utilizing the brake-pressure actuators 16 to 19 provided for the automatic activation of the respective wheel brakes 11 to 14, automatic control of full braking is also possible. The full braking is triggered when the electronic control unit 26 "detects", from the manner in which the driver activates the brake pedal, that braking with the greatest possible degree of deceleration of the vehicle is desired. Then, the brake-pressure actuators 16, 17 of the front-axle brake circuit I and the brake-pressure actuators 18, 19 of the rear-wheel brakes 13, 14 are actuated in the sense of building up the brake pressure with a maximum rate of increase in the brake pressure.

The triggering of such full braking advantageously takes place when the speed $\dot{\phi}$, which can be monitored by the pedal position transmitter 49 and at which the driver activates the brake pedal 29, exceeds a threshold value $\dot{\phi}_s$. Such full braking is continued for as long as the driver activates the brake pedal 29 with increasing force. The development of the force over time can be detected, for example, by the output signals of the pressure sensor 48 which detects the output pressure of the single-circuit master cylinder 31. Continuation of this braking with a reduced rate of increase in the brake pressure can be triggered in that the driver adjusts the brake pedal in accordance with the development of brake pressure but activates the brake pedal with only a relatively small force. The full braking is aborted if the driver releases the brake pedal 29.

The purpose of the brake-pressure control device 21 of the brake system 10 is to achieve, in situations in which the development of brake pressure is controlled by the driver, i.e. in the case of spot braking, as well as full braking, ergonomically favorable relations between the pedal travel and the braking force-deceleration of the vehicle which is actually developed. The braking force can then be best metered, in a fashion appropriate for the situation, if a sufficiently large degree of pedal deflection travel is also combined with a high degree of deceleration of the vehicle. With the brake-pressure control device 21, this pedal travel is made available to a sufficient degree by the pressure accumulator 52, which acts, as it were, as a travel simulator. At the same time this pedal travel is limited to a value which ensures that, in the event of a failure of the brake-pressure actuators 16 to 19 of the front-axle brake circuit I and of the rear-wheel brakes 13 and 14, a sufficient development of brake pressure to permit sufficient minimum deceleration of the vehicle to be obtained solely by activating the single-circuit master cylinder 31 in the front-axle brake circuit.

In such an emergency situation, which can be brought about, for example, by a failure of the vehicle's electrical system, the front-axle brake circuit remains operational, because the change-over valves 38 and 39 drop back into their normal position 0 connecting the wheel brakes 11, 12 to the pressure outlet 32 of the master cylinder 31. As a result of the activation of the master cylinder 31, brake pressure can be built up in the front-wheel brakes 11, 12. At the same time, the function control valve 54 is switched back into its blocking normal position, whereby, the pressure accumulator 52 is blocked off from the single-circuit master cylinder, and the entire volume of whose brake fluid is now available for building up brake pressure in the front-axle brake circuit.

An embodiment of the desired-value setting unit 62 is illustrated in FIG. 1 and comprises the single-circuit master cylinder 31, the pressure accumulator 52 and the function control valve 54. In the event of a failed vehicle electrical system, the unit 62 also permits an emergency braking mode of the front-axle brake circuit and can be modified so that the storage chamber 53 of the pressure accumulator 52 is connected in a permanently communicating manner to the pressure outlet 52 of the single-circuit master cylinder 31. For this embodiment of the brake-pressure control device 21, the single-circuit master cylinder 31 is configured so that the volume of brake fluid which can be displaced from the master cylinder 31 is at least the maximum capacity of the front-wheel brakes 11, 12 plus the absorption capacity of the pressure accumulator 52.

In order to explain further embodiments of the desired-value setting unit 62 of the brake-pressure control device 21, reference will now be made to FIGS. 2a and 2b, in which in each case the part of the brake system 10 which is required for the emergency braking mode is illustrated.

Figure 2A:
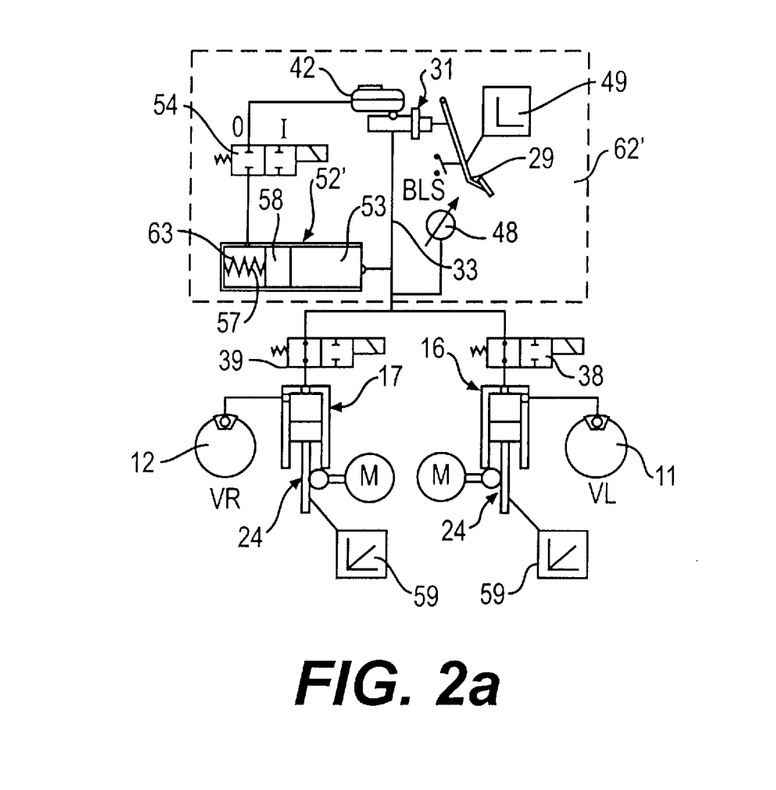
FIGS. 2a and 2b, respectively, are schematic views corresponding to FIG. 1, but of a further embodiment of a brake-pressure control device which can be used in the brake system of FIG. 1.

The desired-value setting unit 62' according to FIG. 2a is functionally analogous to the desired-value setting unit 62 according to FIG. 1 and differs therefrom in structural terms only in that the storage chamber 53 of the piston-spring storage device 52 which is used for pedal travel simulation is connected directly to the master brake line 33 starting from the single-circuit master cylinder. Furthermore, the spring space 63 of the pressure accumulator 53' in which the storage spring 57 is arranged is of fluid-tight construction and is filled with brake fluid. The function control valve 54 is connected between the spring space 63 of the pressure accumulator 52' and the pressureless brake-fluid reservoir vessel 42 of the single-circuit master cylinder 31. The piston 58 of pressure accumulator 52' can be locked in its minimum capacity of the storage chamber 53 so that the function control valve 54 prevents, in its blocking normal position 0, brake fluid overflowing from the spring space 63 into the reservoir vessel 42. With the desired-value setting unit 62' in accordance with FIG. 2a, brake fluid losses due to leakage are largely ruled out.

Figure 2B:
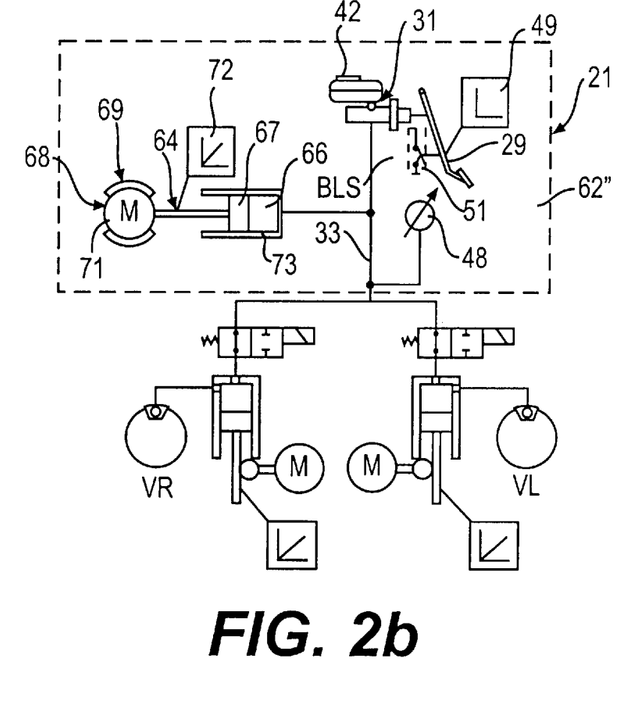

The desired-value setting unit 62" illustrated in FIG. 2b, can also be used in the brake system 10 in accordance with FIG. 1. The unit 62" differs in structural terms from the embodiments described with respect to FIGS. 1 and 2a in that, in order to achieve a desired pedal travel/output pressure characteristic of the single-circuit master cylinder 31, instead of a pressure accumulator 52 or 52' and a function control valve 54, a volume actuator 64 is provided which can be controlled electrically by output signals of the electronic control unit 26 and is constructed structurally analogous to the brake-pressure actuators 16, 17 of the front-axle brake circuit I, as a hydraulic linear cylinder.

The linear cylinder in FIG. 2b has an output pressure space 66 which is connected to the master brake line 33 of the brake-pressure control device 21 and is movably delimited on one side by a piston 67 which is displaceably guided in the cylinder casing in a pressure-tight fashion and which can be displaced in alternative deflection directions by an electromotive linear drive 68. The electromotive linear drive 68 can be actuated by output signals of the electronic control unit 26 in order to drive the piston 67 in its alternative directions of movement.

This electromotive linear drive is constructed as a non-self-locking drive, which is analogous to the electromotive linear drives of the brake-pressure actuators 18, 19 for the respective rear-wheel brakes 13, 14 of the vehicle. However, the electromotive linear drive is provided with a brake 69 which is indicated schematically by two brake blocks and can be released electrically under the control of an output signal of the electronic control unit 26. If the release signal of the electronic control unit 26 is lost, the brake 69 moves automatically, for example as a result of the prestressing of a brake spring (not illustrated), into its brake position which secures the rotor of the electric drive motor 71.

The electromotive linear drive 68 of the volume actuator 64 is provided with an electromechanical or electronic position transmitter, which generates an electrical output signal which is fed to the electronic control unit 26 and is a measure of the position of the piston 67 of the volume actuator 64 within its cylinder casing 73, and thus also a measure of the volume of the output pressure space 66 of the volume actuator 64.

The desired-value setting unit 62" according to FIG. 2b provides at least the below discussed control functions, when used in a brake-pressure control device 21 in accordance with FIG. 1. The intention is that the explanation of these control function will also explain the relevant modification of the circuitry of the electronic control unit 26 which a person skilled in the art can implement, given knowledge of the purpose of the control function, on the basis of current knowledge in the art.

a) Storage function

The volume actuator 64 can be actuated, as a function of output signals of the pedal position transmitter 49 and/or the pressure sensor 48 of the desired-value setting unit 62" in combination with the output signals of the position transmitter 72 of the volume actuator 64. The function of the volume actuator 64 is thereby analogous to that of the pressure accumulators 52 or 52' of the embodiment variants according to FIG. 1 or FIG. 2a. That is, with spot braking, the volume of the output pressure space 66 of the volume actuator 64 rises increasingly as the activation force with which the driver activates the brake pedal 29 increases.

b) Displaying an anti-lock braking control function

If a tendency to lock occurs at one of the wheels during driver-controlled braking and has to be corrected, the volume actuator 64 is actuated in the sense of reducing the volume of its output pressure space 66. As a result, the brake pedal 29 is pushed back counter to the activation force applied by the driver, which intelligibly signals to the driver that the braking situation is potentially hazardous.

The volume actuator 64 can, in principle, be used to realize any desired pedal-travel/brake-pressure characteristics of the desired-value setting unit 62, which can be prescribed in the sense of optimized programming depending on the speed range in which the vehicle is moving and/or the magnitude of the deceleration of the vehicle which is to be determined by activating the brake pedal 29.

In order to explain contemplated configuration of the single-circuit master cylinder 31 which is provided in the brake-pressure control device 21, reference will now be made to FIGS. 3*a* and 3*b*.

Figure 3A:
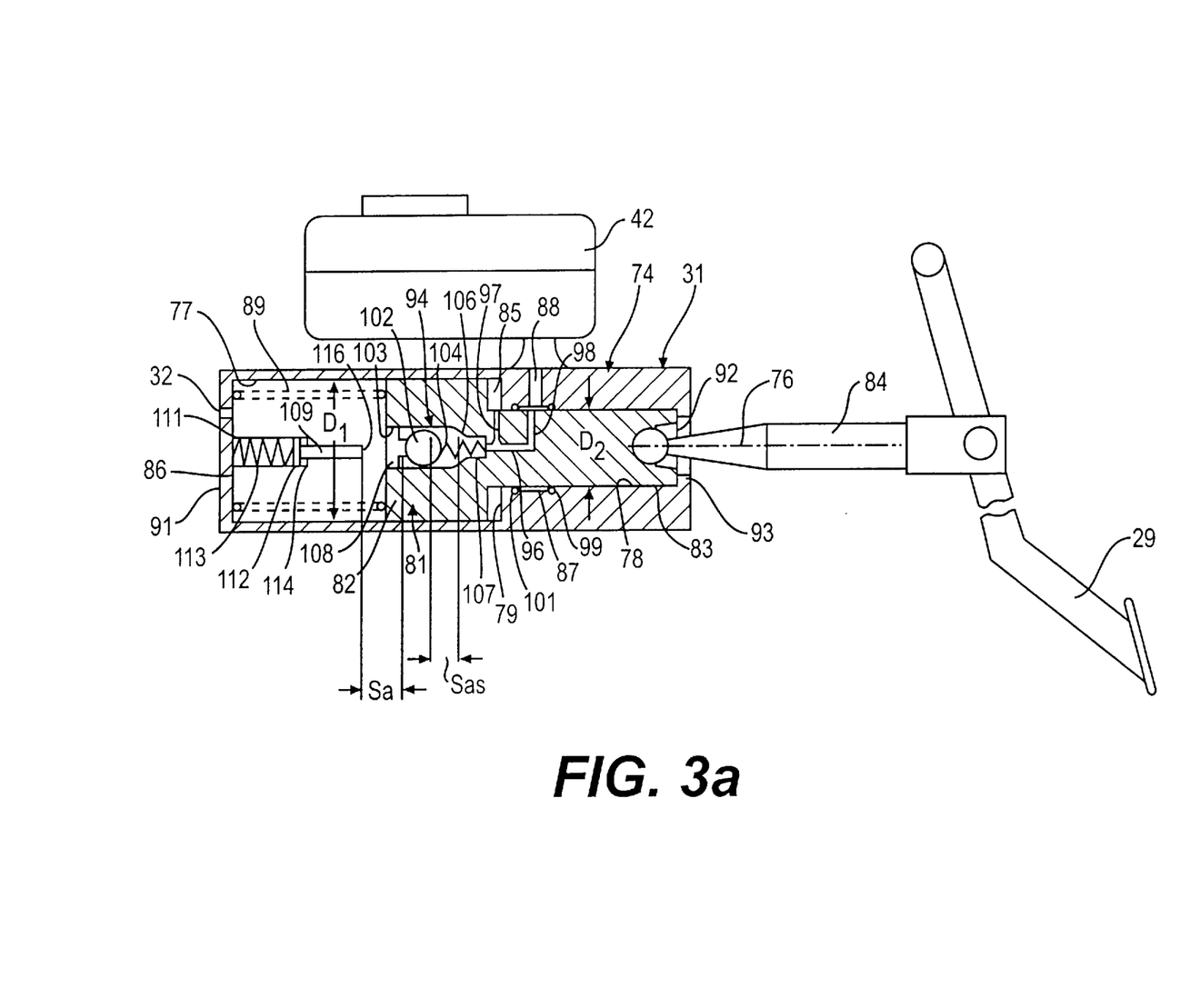
FIGS. 3a and 3b are alternative schematic configurations in longitudinal sectional views of one single-circuit master cylinder which can be used as a brake-pressure transmitter unit in the brake-pressure control device.

The casing 74 of the single-circuit master cylinder 31 shown in FIG. 3*a* has two hole steps 77, 78 which are coaxial with respect to the central longitudinal axis 76 of the master cylinder 31 and have different respective diameters D1, D2 between diameters a radial inner shoulder 79 of the casing 74 runs and via which these hole steps 77 and 78 adjoin one another. The piston 81, which is one piece, is guided so as to be displaceable in a pressure-tight manner with a flange-shaped piston step 82 in the hole step 77 with the larger diameter D1 and with a rod-shaped piston step 83 in the hole step 78 with the smaller diameter D2 of the cylinder casing 74.

The pedal plunger 84 via which the activation force is transmitted to the cylinder piston 81 acts on the rod-shaped piston step 43. Within the hole step 77, the flange-shaped piston step 82 forms, on one hand, the axially movable delimitation of the output pressure space 86 of the master cylinder 31 on one side and, on the other hand, the one, axially movable delimitation of an annular space 85 whose second axial delimitation, which is fixed to the casing, is formed by the radial inner shoulder 79 of the casing 74.

In the pedal-end region of the cylinder casing 74 which is adjacent to the annular shoulder 79 of the casing, the casing 74 is provided with an annular groove 87 which opens into the casing hole 78 with the smaller diameter D2 and forms a run-on and equalizing space which has a continuously communicating connection to the brake-fluid reservoir vessel 42 via a radial passage 88. A restoring spring 89 acts on its flange-shaped piston step 82 and is supported on the end wall 91 of the casing 74 which forms the axial delimitation, fixed to the casing, of the output pressure space 86. Thereby, the piston 81 is forced into its illustrated normal position which corresponds to the maximum volume of the output pressure space 96 and the minimum volume of the annular space 85 and in which the cylinder piston 81 is axially supported with the pedal-end free end face 92 of its rod-shaped piston step 83 on an annular stop shoulder 93 of the casing 74.

The piston 81 is provided with a central valve designated generally by numeral 94. In the illustrated normal position of the piston 81 of the single-circuit master cylinder 31 which corresponds to the non-activated state of the master cylinder 31, the valve 94 assumes an open position in which a central axial equalizing passage 96, which has a permanently communicating connection to the annular space 85 of the single-circuit master cylinder 31 via a radial overflow passage 97, is communicated connected to the output pressure space 86 of the master cylinder 31. The equalizing passage 96 is also communicatingly connected, in the illustrated normal position of the piston 81 of the single-circuit master cylinder 31, to the annular groove 87 of the cylinder casing 74, via a radial blow hole 98.

When the master cylinder 31 is activated, this communicating connection of its annular groove 87, which is arranged between annular seals 99, 101 which are fixed to the casing, is eliminated after a small part of the overall possible pressure-increasing stroke. Thereafter, if the central valve 94 is still open, the communicating connection of the annular space 85 to the output pressure space 86 of the master cylinder 31 still initially exists.

In the further course of a brake-pressure-increasing stroke, the central valve 94 initially remains open, with the result that only a part $m_{s1}$ of the quantity $m_s$ of brake fluid which is displaced in its entirety from the output pressure space 86 of the single-circuit master cylinder 31 when pressure-increasing activation of the master cylinder 31 takes place is displaced via the pressure outlet 32 of the master cylinder 31 to the front-wheel brakes 11 and 12, and the complementary partial quantity $m_{s2}$ is absorbed from the annular space 85 of the master cylinder 31 via the open central valve 34.

The ratio $m_{s1}/m_{s2}$ is given by the relation $$m_{s1}/m_{s2} = D2^2/(D_1^2 - D2^2)$$

This ratio can be prescribed in a defined fashion by appropriate selection of the diameters D1, D2 of the respective casing holes 77, 78 and of the diameters of the piston sections 82, 83 of the master cylinder piston 81 of the master cylinder 31. In a departure from the schematic illustration selected for explanation, the ratio has a value of about 1.

In the illustrated, specific embodiment, the central valve 94 is configured so that, after the piston 81 has executed half of its maximum possible pressure-increasing stroke $s_{max}$ when a brake-pressure-increasing activation of the master cylinder 31 takes place, the central valve 94 moves into a closed position in which the communicating connection of the output pressure space 86 to the annular space 85 of the master cylinder 31 is eliminated. Consequently, when there is a further brake-pressure-increasing activation of the master cylinder 31 and when the displacement of the master cylinder piston 81, which is correlated therewith, in the sense of reducing the volume of the output pressure space 86 takes place, the quantity $M_s$ of brake fluid which is displaced therefrom in total and is related to the unit of the piston stroke is now used to build up brake pressure in the front-wheel brakes 11, 12 of the brake system 10. The master cylinder 31 is thus switched over, in a travel-dependent fashion, to a larger displacement volume per unit of the activation travel of the brake pedal 29. This function state of the master cylinder 31 is assigned to the emergency braking mode which, when the vehicle's electrical system has failed, still ensures that a minimum braking deceleration is achieved.

The central valve 94, in combination with the described configuration of the casing 74 and of the piston 81 of the single-circuit master cylinder 31 enables the master cylinder 31 to be switched over to increasing, in accordance with demand, the quantity of brake fluid which can be used in the emergency braking mode for building up brake pressure. The valve 94 is constructed in the specific embodiment illustrated as a ball-seat valve whose valve ball 102 is axially displaceably arranged in a hole 103 which is coaxial with the central equalizing passage 96 and has a relatively large diameter, which may also be slightly larger than that of the valve ball 102. The valve ball 102 can be forced by a valve spring 104 into a position of maximum distance from a conical valve seat 106 which runs between the hole 103, in which the valve ball is arranged so as to be displaceable backwards and forwards, and an axially short hole step 107 at whose base, from which the central equalizing passage 96 starts, the valve spring 103 is supported at the piston end.

The maximum distance between the valve ball 102 and its valve seat 106 is marked by its bearing against a drive pressure space-end stop element 108 which is inserted into the receiving hole 103 and is provided with azimuthal cutouts via which the output pressure space 86 of the master cylinder 31 remains in continuously communicating connection with the guide hole 103 of the valve ball 102. A stop plunger 109 is arranged within the output pressure space 86 and is coaxial with the central longitudinal axis 76 of the single-circuit master cylinder 31. The stop plunger 109 is forced by a prestressed helical compression spring 111 into a position illustrated in FIG. 3a which is marked by a stop effect of a flange-shaped stop element 112 of the stop plunger 109 with an annular stop element 114 of a guide pipe 113. The free end face 116 of the plunger 109 is, as viewed in the illustrated normal position of the master cylinder piston 81, at an axial distance $s_a$ from the valve ball 102 which is significantly smaller than half the maximum piston stroke $s_{max}$ by which the master cylinder piston 81 can be displaced between its illustrated normal position and a limit position which corresponds to the minimum volume of its output pressure space 86 and is expediently marked by the block position of the turns of the restoring spring 89. The prestressing of the restoring spring 89 moves the master cylinder piston 81 back into its normal position when the brake pedal 29 is released.

The prestressing of the helical compression spring 111 which forces the stop plunger 109 into its illustrated "normal" position is greater than the axial prestressing of the valve spring 104 which is obtained in the closed state of the central valve 94 in which its valve ball bears against the valve seat 196 in a sealing manner.

In turn, the axial distance $s_{as}$ of the valve ball 102 from its seat 106 has, viewed in the illustrated normal position of the master cylinder piston 81, a value which itself is significantly smaller than half the value of the maximum pressure-increasing stroke $s_{max}$ of the master cylinder piston 81. The sum of the distance values $s_{as}+s_a$ corresponds to half the maximum displacement stroke $s_{max}$ of the master cylinder piston 81.

The helical compression spring 111 which forces the stop plunger 109 into its illustrated position which corresponds to the maximum distance of its free end face 116 from the end wall 91 of the cylinder casing 74 is dimensioned so that it can be compressed or shortened, by half the maximum stroke $s_{max}$ of the master cylinder piston 81.

The annular space-end annular lip seal 101 seals the annular groove 87 of the master cylinder casing 31 with respect to the annular space 85, and enables the function of a non-return valve which is acted on in the opening direction when there is lower pressure in the annular space 85 than in the reservoir vessel 42 of the single-circuit master cylinder 31. The lip seal 101 is acted on in a blocking fashion when there is relatively higher pressure in the annular space 85 of the master cylinder 31 than in its reservoir vessel 42.

The single-circuit master cylinder 31 whose configuration has been explained thus far permits the following functions in the brake system 10 in accordance with FIG. 1. The stroke range of the magnitude $s_{max}/2$, within which the central valve 94 of the master cylinder piston 81 remains open when the master cylinder 31 is pedal-activated, is utilized for the electronically controlled generation of brake pressure and/or control of the distribution of braking force.

The stroke of the master cylinder piston 81 which is additionally made available and within which the central valve is closed, permits, in relation to the piston stroke, a greater quantity of brake fluid to be fed into the front-wheel brakes 11 and 12 without accompanying action of the brake-pressure actuators 16 and 17 of the front-axle brake circuit. Thus, a desired minimum deceleration of the vehicle is achieved even if all the brake-pressure actuators 16 to 19, which are normally electrically controlled, are no longer operational.

In this emergency operating state of the master cylinder 31, the non-return valve which is formed by the annular space-end sealing ring 101 of the master cylinder 31 and via which brake fluid can now subsequently flow, in emergency operating mode, from the reservoir vessel 42 into the annular space 85 is active, although the central valve 94 assumes its blocking position.

Figure 3B:
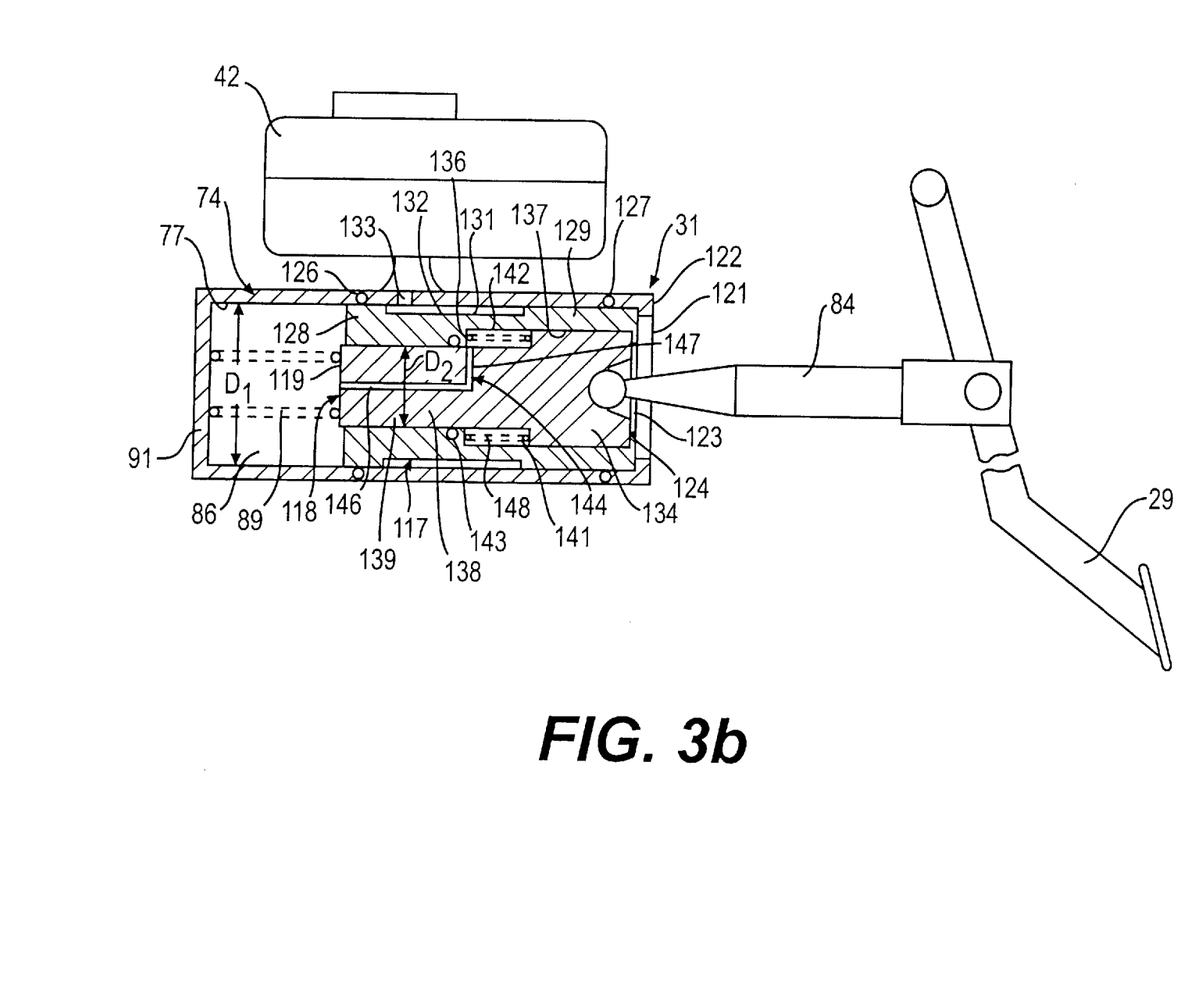

In the single-circuit master cylinder 31 which is illustrated in FIG. 3b and which can be used in the brake system 10 according to FIG. 1, the single-side, axially movable delimitation of its output pressure space 86 is formed by a piston arrangement 117, 118 which comprises an outer annular piston 117 and a step piston 118 which is coaxially surrounded thereby and on which the pedal plunger 84 acts. A restoring spring 89 is supported on the end wall 91 of the cylinder casing 74, which end wall 91 forms the axial delimitation, fixed to the casing, of the output pressure space 86, and acts on the central, opposite end face 119 of the step piston 118. Thereby, the piston arrangement 117, 118 is forced into the illustrated normal position which corresponds to the non-activated state of the master cylinder 31 and in which the annular piston 117 is axially supported with its pedal-end annular face 121 on a radially inwardly pointing stop ring 122 of the cylinder casing. The step piston 118 is axially supported with its pedal-end end face on a radially inwardly pointing, annular stop flange 124 of the annular piston 117.

Two annular seals 126, 127 are fixed to the piston and arranged on end flanges 128 and 129 of the annular piston 117. Thereby, the annular piston 117 is sealed with respect to the casing hole 77 whose diameter has the value $D_1$ over the entire length of the casing between its end wall and its stop ring 122. An annular space 132 extends between the output pressure space-end end flange 128, whose annular seal 126 provides a high-pressure-tight seal, and the pedal-end end flange 129 of the annular piston 117. The annular space 132 is bounded by a flat annular groove 131 of the annular piston 117 and, independently of the piston position, is communicatingly connected to the reservoir vessel 42 via a radial casing passage 133.

An annular space 141 extends between the pedal-end, flange-shaped piston step 134 of the step piston 118, which piston step 134 is mounted in a sliding fluid-tight manner in a hole step 137 with the same diameter as the annular piston 117, and a radial inner shoulder 136 of the annular piston 117 which provides the connection of the hole step 137 receiving the flange-shaped piston step 134, to the hole step 139 receiving the rod-shaped piston step 138 of the step piston 118 and having the smaller diameter D2. The annular space 141 is communicatingly connected via a radial passage 142 to the radially outer annular space 132, and also to the reservoir vessel 42 via the latter. An annular seal 143 which provides the high-pressure-tight sealing of the rod-shaped piston step 138 of the step piston 118 with respect to the hole step 139 with the same diameter as the annular piston 117 is arranged on the annular piston 117 in the direct vicinity of the radial inner shoulder 136 of the annular piston 117.

The rod-shaped section 138 of the step piston 118 is provided with a blow passage 144 which has an axial section 146 extending over part of the length of the rod-shaped section 138 of the step piston and opening into the output pressure space 86 of the single-circuit master cylinder 31, and a radial section 147 starting from the inner end of the said axial section 146. In the illustrated normal position of the piston arrangement 117, 118, the radial section 147 opens, directly next to the radial inner shoulder 136 of the annular piston 117, into the radially inner annular space 141 delimited by the annular piston 117 and the step piston 118.

In this illustrated normal position of the piston arrangement 117, 118 there is also a communicating connection of the output pressure space 86 to the brake fluid reservoir vessel 42 exists. When the brake pedal 29 is activated, this communicating connection is interrupted after a small initial part of the piston stroke. The build-up of pressure in the output pressure space 86 of the single-circuit master cylinder does not start until this interruption has occurred. Arranged in the radially inner annular space 141 is a helical compression spring 148 for achieving the desired pedal force/output pressure characteristic.

A specific configuration of the helical compression spring 148 may consist in the product of its spring rate and the stroke of the step piston 118 being equal to the product of the pressure prevailing in the output pressure space 86 and the annular end face, partially delimiting the latter in a movable manner, of the annular piston 117, when the central step piston has executed half of its maximum possible piston stroke $s_{max}$ in the course of an activation of the brakes.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A brake-pressure control device for a vehicle with electrohydraulic multi-circuit brake system having an electronic control unit, comprising
    (a) hydraulic servo-cylinders individually assigned to vehicle wheel brakes and arranged to be driven by an electric motor to permit, in one stroke of a respective piston thereof, a maximum brake pressure in a connected wheel brake for which the wheel brake is configured to be increased and decreased and, under control of output signals of the electronic control unit implements at least:
        (i) spot braking in accordance with desired-value signals triggerable by a vehicle driver by a desired-value setting unit and characteristic of anticipated value of deceleration of the vehicle, including control of the front-axle/rear-axle braking force distribution;
        (ii) anti-lock braking control by automatic brake pressure modulation;
        (iii) traction control by automatic activation of the wheel brake of a vehicle wheel tending to slip; and
        (iv) vehicle movement control by automatically controlled increase in brake slip at at least one of the vehicle wheels,
    (b) the desired-value setting unit comprising a single-circuit master cylinder having an output pressure space connected to front-wheel brakes by a change-over valve configured as a two-position solenoid valve with a blocking functional position to which it is moved when its switching magnets are excited, to block off the front-wheel brakes from the single-circuit master cylinder and with a flow position to which it is moved as normal position, to displace brake fluid directly into the front-wheel brakes by activating the master cylinder, wherein:
    (c) the single-circuit master cylinder is configured such that the volume of brake fluid displaceable from an output pressure space thereof as a result of displacement of a piston thereof by a maximum stroke $s_{max}$ is substantially greater than a capacity of the wheel brakes of the front-axle brake circuit which has to be displaced into the brake to achieve a defined pressure necessary for minimum deceleration;
    (d) the front-wheel brakes are configured to be also blocked off from the single-circuit master cylinder in the event of electrically controlled spot braking, and a maximum capacity of output pressure spaces of the brake-pressure servo-cylinders of the front-wheel brakes is limited to a volume capable of being displaced into the respectively connected front-wheel brake to achieve a maximum brake pressure;
    (e) a storage element into which brake fluid can be displaced from the single-circuit master cylinder counter to an increasing reaction force is connected to a pressure outlet of the single-circuit master cylinder of the desired-value setting unit, the maximum capacity of the storage element corresponding at maximum to an additional amount by which the volume of brake fluid which is displaceable from the master cylinder is greater than the volume of brake fluid which can be displaceable into the front-wheel brakes in emergency operating mode to achieve the defined minimum deceleration.

2. The brake-pressure control device according to claim 1, wherein the maximum capacity of the storage element is between 30% and 60%, preferably about 50%, of the total maximum absorption volume of the front-wheel brakes.

3. The brake-pressure control device according to claim 1, wherein the storage element is constructed as a piston-spring storage device.

4. The brake-pressure control device according to claim 1, wherein the storage element is configured and arranged to be blocked off from the single-circuit master cylinder.

5. The brake-pressure control device according to claim 4, wherein a change-over valve is constructed as a 2-position solenoid valve and has excited position constituting a flow position and a normal position constituting a blocking position, the change-over valve being connected between the storage element and the single-circuit master cylinder.

6. The brake-pressure control device according to claim 4, wherein the storage element is constructed as a piston-spring storage device having a storage spring arranged in a fluid-tight spring chamber which is connected via an equalizing line to a brake-fluid reservoir vessel of the single-circuit master cylinder, and the equalizing flow path is configured to be blocked off by a change-over valve constructed as a 2-position solenoid valve with flow position constituted by an excited position and a blocking position constituted by a normal position.

7. The brake-pressure control device according to claim 1, wherein the storage element is a hydraulic servo-cylinder adapted to be driven by electric motor and having a position-monitored piston.

8. The brake-pressure control device according to claim 7, wherein a piston drive of the hydraulic servo-cylinder is configured to be not self-locking and is provided with an arresting brake which is automatically actuatable in a de-energized state.

9. The brake-pressure control device according to claim 1, wherein, for the emergency braking mode, the single-circuit master cylinder is configured to be adjusted to a ratio of a displacement volume thereof related to the stroke which is increased in comparison with the spot braking mode.

10. The brake-pressure control device according to claim 9, wherein the single-circuit master cylinder is configured to be adjusted, with automatic path control, to the emergency braking mode with an increased displacement volume/stroke ratio.

11. The brake-pressure control device according to claim 10, wherein a piston of the single-circuit master cylinder is a step piston having a larger diameter piston step which forms an axially movable delimitation of the output pressure space and with an annular end face which adjoins a smaller piston step thereof and having magnitude given by a difference of the end face which delimits the output pressure space and the cross-sectional face of the smaller piston step, the axially movable delimitation of an annular space, and the piston is provided with a central valve arranged to be forced into an open position by prestressing of a valve spring and, starting from a minimum stroke $s_{min}$ of the piston, moves into a blocking position thereof as the result of a stop effect of a valve body thereof with a stop element which is elastically resilient in an axial direction, and a non-return valve is connected between the annular space and the reservoir vessel and is acted on, in an blocking direction, by a relatively higher pressure in an annular space of the master cylinder than in the reservoir vessel and is acted on in an opening direction by relatively higher pressure in the reservoir vessel than in the annular space of the single-circuit master cylinder.

12. The brake-pressure control device according to claim 11, wherein the non-return valve is formed by an annular lip seal configured to seal the smaller piston step of the step piston with respect to the annular space and with respect to an annular groove which is communicatingly connected to the reservoir vessel.

13. The brake-pressure control device according to claim 10, wherein the single-circuit master cylinder comprises a central piston displaceably guided in a pressure-tight manner in an annular piston sealed with respect to the casing so as to be pressure-tightly displaceable, the central piston being forcible, by a restoring spring of the master cylinder which axially penetrates the output pressure space of the master cylinder, into a normal position thereof corresponding to a largest volume of the output pressure space and the brake pedal engaging on the piston, and the central piston being provided with a pedal-side arranged flange-shaped piston step which, starting from a minimum stroke $s_{min}$ of the central piston, moves along the annular piston in the sense of a pressure-increasing stroke from axial support thereof on a radial inner shoulder of the annular piston.

14. The brake-pressure control device according to claim 13, wherein the radial inner shoulder of the annular piston and the pedal-side flange-shaped piston step of the central piston delimit a radially inner annular space in the axial direction, which annular space is communicatingly connected via a radial passage of the annular piston to a radially outer annular space held in a permanently communicating connection to the reservoir vessel, and the central piston is provided with a blow passage which, in the normal position of the central piston, produces a communicating connection between the output pressure space and the annular space, which latter connection is eliminated after a small initial section of the pressure-increasing stroke of the central piston.

15. The brake-pressure control device according to claim 14, wherein a prestressed compression spring, whose prestress is smaller than that of the restoring spring of the single-circuit master cylinder, is arranged in the radially inner annular space of the piston arrangement.

16. A brake-pressure control method for a vehicle with electrohydraulic multi-circuit brake system, comprising the steps of (a) permitting, in one stroke of a respective piston of hydraulic servo-cylinders individually assigned to vehicle wheel brakes, a maximum brake pressure in a connected wheel brake for which the wheel brake is configured to be increased and decreased;

(b) implement at least the following functions:
  (i) spot braking in accordance with desired-value signals triggerable by a vehicle driver characteristic of anticipated value of deceleration of the vehicle, including control of the front-axle/rear-axle braking force distribution;
  (ii) anti-lock braking control by automatic brake pressure modulation;
  (iii) traction control by automatic activation of the wheel brake of a vehicle wheel tending to slip; and
  (iv) vehicle movement control by automatically controlled increase in brake slip at at least one of the vehicle wheels;

(c) selectively providing a single-circuit master cylinder having an output pressure space connected to front-wheel brakes with a blocking functional position to block off the front-wheel brakes from the single-circuit master cylinder and with a flow position to displace brake fluid directly into the front-wheel brakes;

(d) providing a volume of brake fluid displaceable from an output pressure space of the single-circuit master cylinder as a result of displacement of a piston thereof by a maximum stroke $s_{max}$, which volume is substantially greater than a capacity of the wheel brakes of the front-axle brake circuit which has to be displaced into the brakes to achieve a defined pressure necessary for minimum deceleration;

(e) selectively blocking off the front-wheel brakes from the single-circuit master cylinder in the event of electrically controlled spot braking, with a maximum capacity of output pressure spaces of the servo-cylinders of the front-wheel brakes being limited to a volume capable of being displaced into the respectively connected front-wheel brake to achieve maximum brake pressure; and (f) displacing brake fluid into a storage element from the single-circuit master cylinder counter to an increasing reaction force, the maximum capacity of the storage element corresponding at maximum to an additional amount by which the volume of brake fluid which is displaceable from the master cylinder is greater than the volume of brake fluid which is displaceable into the front-wheel brakes in emergency operating mode to achieve the defined minimum deceleration.

* * * * *